United States Patent [19]
Shimizu et al.

[11] Patent Number: 5,870,492
[45] Date of Patent: Feb. 9, 1999

[54] HAND-WRITTEN CHARACTER ENTRY APPARATUS

[75] Inventors: Shinji Shimizu; Masao Kumagishi, both of Saitama, Japan

[73] Assignee: Wacom Co., Ltd., Tokyo, Japan

[21] Appl. No.: 894,147

[22] Filed: Jun. 4, 1992

[51] Int. Cl.⁶ .................................................. G09G 1/06
[52] U.S. Cl. ........................... 382/187; 382/188; 382/189
[58] Field of Search ............................. 382/13, 187, 188, 382/189

[56] References Cited

U.S. PATENT DOCUMENTS

| | | | |
|---|---|---|---|
| 4,672,677 | 6/1987 | Yamakawa | 382/13 |
| 4,686,522 | 8/1987 | Hernandez | 340/721 |
| 4,953,225 | 8/1990 | Togawa | 382/13 |
| 4,972,496 | 11/1990 | Sklarew | 382/13 |
| 5,150,424 | 9/1992 | Aguro | 382/13 |

FOREIGN PATENT DOCUMENTS

| | | | |
|---|---|---|---|
| 0316284 | 12/1988 | Japan | 382/13 |
| 0249086 | 10/1990 | Japan | 382/13 |

*Primary Examiner*—Minsun Oh Harvey
*Attorney, Agent, or Firm*—Lowe Hauptman Gopstein Gilman & Berner

[57] ABSTRACT

An inscribed character is recognized with a device including a memory for storing signals representing the shapes of plural inscribed characters, a sensor for the shapes of inscribed characters, a comparator for the stored signals and signals from the sensor, and a display. The comparator compares a signal representing the sensed shape of the inscribed character and the stored signals representing the shapes of plural characters likely to be inscribed to derive signals representing plural selected candidate characters similar in shape to the inscribed character. In response to the signals representing plural selected candidate characters similar in shape to the inscribed character the plural candidate characters are displayed on a first region of the display abutting a second region where there is a representation of the inscribed character. One of the displayed plural candidate characters that is the intended character for the inscribed character is selected by an operator pressing a stylus against the intended character. A signal indicative of which of the displayed candidate character is the selected character is derived and causes the selected character to replace the inscribed character.

15 Claims, 8 Drawing Sheets

HAND-WRITTEN CHARACTER ENTRY APPARATUS

BACKGROUND OF THE INVENTION

1. Field of the Invention

The present invention relates to an improvement in hand-written character entry apparatus.

2. Description of the related Art

Hitherto, various types of hand-written character entry apparatuses have been known which recognize hand-written characters input through a tablet input devices or the like and display standard character patterns corresponding to the result of the recognition, while encoding the characters for the purpose of storage or transfer to another device.

Difficulty is encountered in processing of Japanese words due to presence of a plurality of modes of characters such as "Kanji", "Hiragana", "Katakana", "alphabet" and "numerals". There are some characters which are very similar in shape to each other but are of different modes of character. For instance, a hiragana character "り" and a katakana character "リ" can hardly be discriminated from each other. This applies also to the case of discrimination between a hiragana character "へ" and a katakana character "ヘ".

In order to correctly recognize such characters on the known hand-written character entry apparatus, a method has been proposed and used in which the hand-written characters are input after designation or appointment of a specific character mode. When such a method is used, a problem is encountered in that recognition of hand-written character is failed despite repetition of the entry operation, due to, for example, habit or tendency of character form peculiar to individual operator.

Another known method for obtaining correct recognition result is to extract and display, as candidate character, all the characters having configurations similar to that of the entered hand-written character, so that the operator can select the correct character from among those on display. To enable the selection of the correct character from among the displayed candidate characters by means of a tablet input device as is the case of hand-write entry of character, a menu area is provided on a specific area of the display for the purpose of displaying candidate characters, and the correct character is picked up as the operator appoints the position of the correct character by means of an appointing device, i.e., a tablet input device.

Thus, the known hand-written character entry apparatuses suffer from disadvantages in that the operator has to turn eyes from the position where the recognition result is displayed to the menu area each time the candidate characters are shown for selection, and in that the operator is obliged to move the appointing device such as tablet input device from the hand-write entry position to a position corresponding to the menu area. Consequently,entry of hand-written characters is quite laborious and troublesome.

In view of the above-described problems encountered with the known arts, an object of the present invention is to provide a hand-written character entry apparatus which can provide exact recognition result without requiring the operator to frequently turn eyes and frequent movement of the position of the appointing device such as a tablet input device.

To this end, according to the basic form of the present invention, there is provided a hand-written character entry apparatus of the type having an input device for inputting hand-written characters and a display device, wherein hand-written character pattern inputted by the input device is recognized and a plurality of candidate characters having configurations similar to that of the recognized character pattern are extracted and standard character patterns corresponding to the candidate characters are displayed for selection on the display device, the hand-written character entry apparatus comprising: means for providing, at a position in the display device corresponding to the position where the hand-written character is input by the input device, an input character display area for displaying a first candidate character exhibiting the highest degree of similarity among the candidate characters; means for providing, at a position in the display device adjacent to the input character display area, a candidate character display area for displaying the plurality of candidate characters including or excluding the first candidate character; means for detecting that a signal appointing any portion of the candidate character display area has been input through the input device; and means for replacing the first candidate character with the candidate character displayed at the portion of the candidate character display area appointed by the input device.

In a preferred form of the invention, a plurality of the input character display areas are provided and the candidate character display area is provided for each of the input character display area.

In this form of the invention, the arrangement may be such that a candidate character display area associated with one of the input character display area is displayed in a window which overlies another input character display area or areas.

Preferably, the input device and the display device are constructed as a unit with each other.

According to a different preferred form of the present invention, the hand-written character entry apparatus further includes, in addition to the features of the basis form: means for appointing, by the operation of the input device, at least two successive input character display areas from among a series of input character display areas displaying first candidate characters; means for conducting kana-kanji conversion of the batch of first candidate characters displayed in the at least two successive input character display areas appointed by the operation of the input device, so as to extract a plurality of candidate kanji characters; means for enabling a first candidate kanji character in one of the at least two successive input character display areas while enabling the plurality of candidate kanji characters in the candidate character display area including or excluding the first candidate kanji character; and means for replacing the first candidate kanji character with another candidate kanji character selected through the input device out of the candidate kanji characters displayed in the candidate character display area.

According to the basic form of the invention as described, a first candidate character obtained on the basis of the result of character recognition is displayed in an input character display area corresponding to the position where the hand-written character has been entered, and a plurality of candidate characters including or excluding the first candidate character are displayed in the candidate character display area adjacent to the above-mentioned input character display area. When a signal is input through the input device so as to appoint any portion of the candidate character display area, the first candidate character is automatically replaced with the candidate character which is displayed at the appointed portion of the candidate character display area.

When a plurality of input character display areas are provided and a candidate character display area is associated with each of the input character areas, a series of hand-written characters entered through the input device are displayed at a time to enable the user to grasp the context of a sentence and to effect change or replacement of the candidate character for each of the input character.

When the candidate character display area associated with one of the input character display area is displayed in a window overlying another input character display area, the overall display area and, hence, the area of the input device can be reduced advantageously.

When the input device and the display device are integrated in an superimposed manner, operation such as replacement of the candidate character is facilitated because the position where the character is entered and the position where the entered character id displayed coincides with each other.

According to the different preferred form of the invention stated above, it is possible to easily conduct entry of hand-written characters, as well as character;kanji conversion and replacement of candidate kanji characters.

DESCRIPTION OF THE PREFERRED EMBODIMENTS

Figure 1:
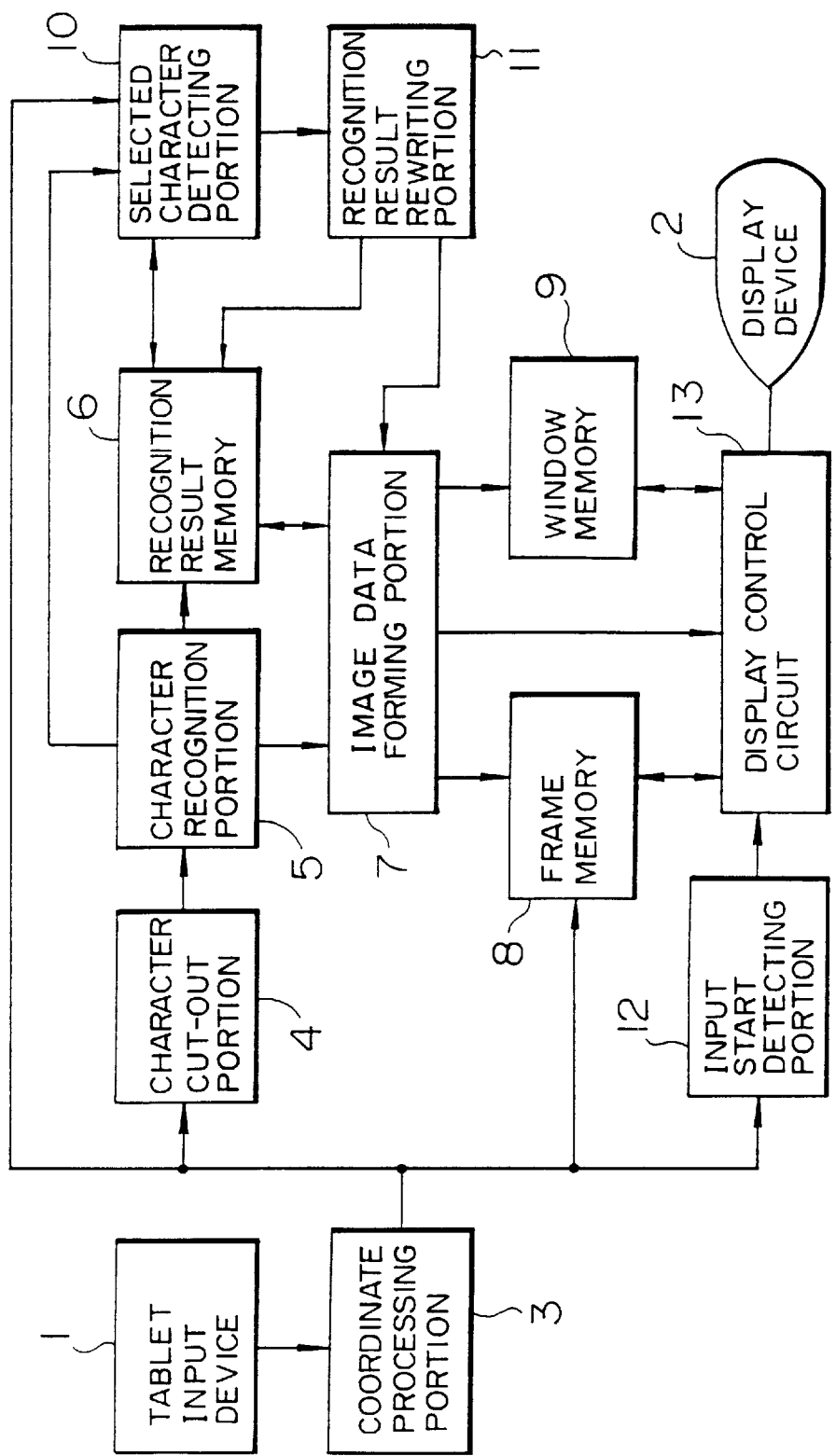
FIG. 1 is a block diagram showing the construction of a first embodiment of the hand-written character entry apparatus of the present invention.

Referring to FIG. 1, a first embodiment of the hand-written character entry apparatus of the present invention has a tablet input device 1, a display device 2, a coordinate processing portion 3, a character cut-out portion 4, a character recognition portion 5, a recognition result memory 6, an image data forming portion 7, a window memory 9, a selected character detecting portion 10, a recognition result rewriting portion 11, an input start detecting portion 12, and a display control circuit 13.

Figure 2:
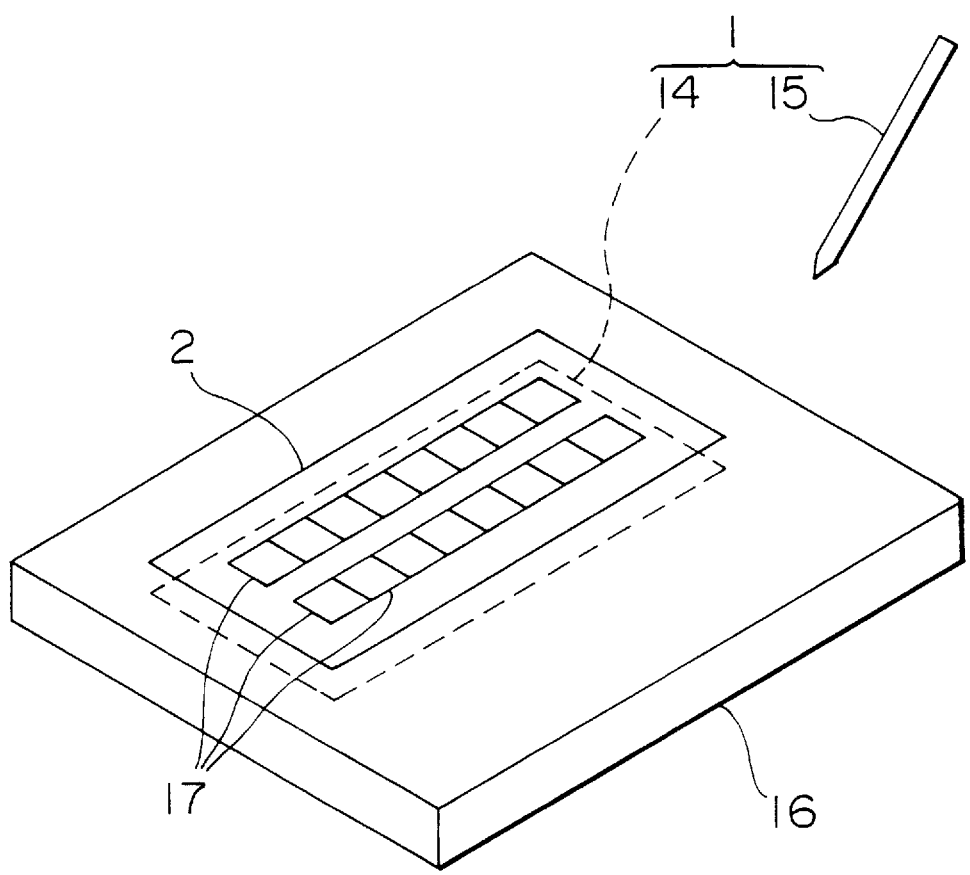
FIG. 2 is a perspective view of the embodiment shown in FIG. 1.

As will be seen from FIG. 2, the tablet input device 1 may of of a known type which includes a tablet 14 of a size substantially the same as that of the display unit 2 and a stylus pen 15. The tablet 14 is accommodated beneath the display device 12 in the main body 16. The arrangement is such that, when the stylus pen 15 is moved on the tablet 14 across the display unit 2, a position designated by the stylus pen 15 is detected in terms of x and y coordinate values. At the same time, whether the pen is in "up" position or "down" position, i.e., whether the stylus pen 15 is spaced from the surface of the display device 2 or in contact with the same, is detected.

The display unit 2 is of a known tabular type incorporating, for example, a liquid crystal display panel. In FIG. 2, the display device 12 has an entered character display area in the form of 16 (sixteen) character boxes 17 for displaying the entered hand-written characters and first candidate characters which most closely approximate the entered characters from among plurality of candidate characters obtained through character recognition.

The coordinate processing portion 3 converts the coordinate values entered through the tablet input device 1 into values corresponding to the scale of the display device 2.

The character cut-out portion 4 cuts out characters one by one from a series of hand-written character patterns entered by the tablet input device 1. More specifically, after the entry of hand-written characters by the stylus pen 15 is commenced beginning from one of the character frames 17, any movement of the stylus pen in the "up" state to the exterior of a character box 17 is regarded as being completion of writing of one character, thus cutting cut such individual characters in one-by-one fashion. This character cut-out method, however, is only illustrative and cut-out of character may be conducted by other suitable method.

The character recognition portion 5 recognizes the cut-out hand-written character pattern and extracts a plurality of candidate characters having configurations similar to that of the recognized hand-written character pattern, and stores in the recognition result memory 6 the codes corresponding to these candidate characters in the order of closeness of similarity.

The recognition result memory 6 stores character codes corresponding to the candidate characters for each of the hand-written character pattern in each character box 17.

The image data forming portion 7 writes image data in the frame memory 8 and the window memory 9 on the basis of the results of the recognition stored in the recognition result memory 6, and informs the display control circuit 13 of the completion of writing of the data. More specifically, the writing of the image data is conducted such that a standard character pattern corresponding to the first candidate character exhibiting the highest degree of similarity is written in an area in the frame memory 8 corresponding to the character box 17, and that standard character patterns corresponding to the plurality of candidate characters are stored in later-mentioned candidate character boxes provided in the window memory 9.

Figure 3:
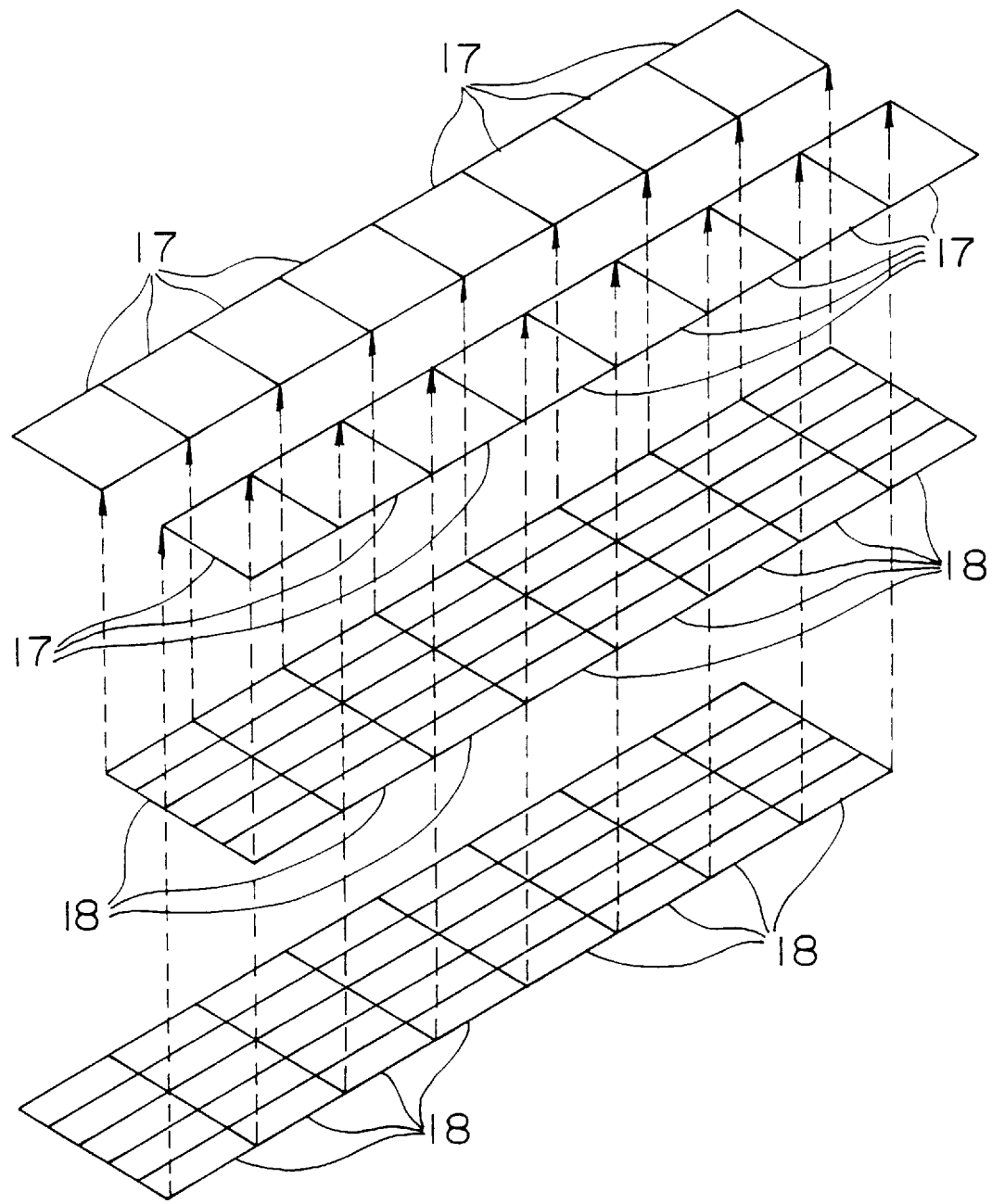
FIG. 3 is an illustration of a candidate character display boxes.

The candidate character boxes show areas for displaying the plurality of candidate characters including the first candidate character. As will be seen from FIG. 3, there are 16 candidate character boxes 18 corresponding to 16 character boxes 17. Each candidate character box 18 is divided into a plurality of sub-boxes. In the illustrated case, there are five sub-boxes for each candidate character box 18. Each of the sub-boxes displays one standard character pattern. The arrangement is such that the candidate character boxes 18 corresponding to the upper row of the character boxes 17 are disposed adjacent to and below the upper row of the character frames 17, while the candidate character patterns 18 corresponding to the lower row of the character boxes 17 are disposed adjacent to and above the upper row of the character boxes 17.

The character boxes 17 and the candidate character boxes 18 are written into the frame memory 8 and into the window memory 9, respectively, in advance of the hand-write entry of characters, when, for example, the power supply of the hand-written character entry apparatus is turned on.

The frame memory 8 has a storage capacity large enough to cover the entire area of the display frame of the display device 2, while the window memory 9 has a storage capacity corresponding to 16 candidate character boxes 18 mentioned before.

The function of the selected character detecting portion 10 is as follows. After completion of recognition of the entered character, the operator selected one of the candidate character boxes 18. The selected character detecting portion 10 detects the coordinate position of the appointed candidate character box 18, i.e., which one of a plurality of candidate characters has been selected, on the basis of the content of the recognition result memory 6. The selected character detecting portion 10 then informs the recognition result rewriting portion 11 of the result of the detection.

The recognition result rewriting portion 11 then rewrites the content of the recognition result memory 6 such that the selected candidate character is stored as the first candidate character, and delivers the rewritten content of the recognition result memory 6 to the image data forming portion 7.

The input start detecting portion 12 detects, on the basis of the coordinate values received from the tablet input device 1 and a "pen down" signal, the input of a character into one of the character box 17 has been started, and delivers a signal indicative of the detection to the display control circuit 13.

The display control circuit operates, upon receipt of signal from the input start detecting portion 12, such that the data from the frame memory 8 alone is displayed on the display device 2, whereas, when the signal from the image data forming portion 7 is received, it operates to cause the display device 2 to display the data held by the corresponding character box 18 in the window memory 9 and images formed by the data in the frame memory 8 except the above-mentioned candidate character box 18.

The operation of the hand-written character input device will now be described.

It is assumed here that the operator has brought the stylus pen into contact with the character box 17 which is the fourth one in the upper row of boxes 17 as counted from the left in FIG. 4(*a*) and has written Hiragana character " ん " in this box 17. The start of the input is detected by the input start detecting portion 12 and the data of the entered hand-written character is written in the frame memory 8, whereby the hand-written pattern 19 is displayed in the above-mentioned character box 17 of the display device 2 as shown in FIG. 4(*a*), as a result of operation of the display control circuit 13. Standard character patterns of hiragana characters " も ", " し " and " に ", which have been already entered by hand writing and correctly recognized, are displayed in the first, second and third boxes of the upper row of boxes 17.

The data of the character pattern 19 is input also to the character cut-out portion 4 which, as described before, cuts outs independent character " ん " and delivers it to the character recognition portion 6. The character recognition portion 5 examines the character pattern 19 to recognize it as a character, and operates to extract a plurality of, five in this case, candidate characters in the order of degree of similarity, e.g., hiragana character " し ", hiragana character " ん ", katakana character " レ ", alphabetic capital letter "L" and alphabetic small letter "l". The character recognition portion 5 then operates to store, in the recognition result memory 6, the character codes which correspond to these extracted characters.

The image data forming portion, when informed of completion of character recognition, operates to write the standard character pattern 20 corresponding to " し " in the portion of the frame memory 8 corresponding to the fourth character frame 17 of the upper row, in accordance with the content of the recognition result memory 6. At the same time, standard character patterns 21 corresponding to hiragana character " し ", hiragana character " ん ", katakana character " レ ", alphabetic capital letter "L" and alphabetic small letter "l" are written in the portions of the window memory 9 corresponding to the candidate character box 18 associated with the above-mentioned character box 17.

The display control circuit 13, when informed of the completion of writing of imaged data, operates such that, as shown in FIG. 4(*b*), the display device 2 displays the standard character pattern 20 corresponding to " し " in the fourth character box 17 of the upper row, while displaying a candidate character frame 18 containing standard character patterns 21 corresponding to the hiragana character " し ", hiragana character " ん ", katakana character " レ ", alphabetic capital letter "L" and alphabetic small letter "l".

Thus, in this case, hiragana character " し " has been determined as the character which has the highest degree of similarity to the hand-written character. Actually, however, the character which the operator has entered by hand writing is the hiragana character " ん ". A correction is therefore necessary.

To correct the result of the recognition, the operator puts the stylus pen 15 into contact with the sub-box 18 in the displayed candidate character box 18 which displays the standard character pattern " ん " corresponding to the actually entered character, i.e., the second sub-box from the top.

As a result, the selected character detecting portion 10 detects that the hiragana character " ん " has been selected from among the plurality of candidate characters, on the basis of the coordinate values of the position of the stylus pen, and informs the recognition result rewriting portion 11 of the result of the detection. In response to this operation, the recognition result rewriting portion 11 operates to rewrite the content of the recognition result memory 6 such that the hiragana character " ん " is shown as the first candidate character, and delivers the result of the rewrite to the image data forming portion 7.

In response to this operation, forming portion 7 writes data into the frame memory 8 and the window memory 9, on the basis of the rewritten content of the recognition result memory 6. More specifically, the standard character pattern 20 corresponding to hiragana character " ん " is written in the portion of the frame memory 8 corrsponding to the fourth character box 17 of the upper row, and standard character patterns 21 corresponding to the hiragana character " ん ", hiragana character " し ", katakana character " レ ", alphabetic capital letter "L" and alphabetic small letter "l". are written in the mentioned order in the candidate character box 18 associated with the above-mentioned character box 17.

When this writing operation is finished, the display control circuit 13 operates such that, as shown in FIG. 4(*c*), the standard character pattern 20 corresponding to hiragana character " ん " is displayed in the fourth character box 17 of the upper row, while a candidate character box 18 is displayed right below the above-mentioned character box 17, containing the patterns 21 corresponding to the hiragana character " ん ", hiragana character " し ", katakana character " レ ", alphabetic capital letter "L" and alphabetic small letter "l" are written in the mentioned order in the candidate character box 18 associated with the above-mentioned character box 17.

Figure 4A:
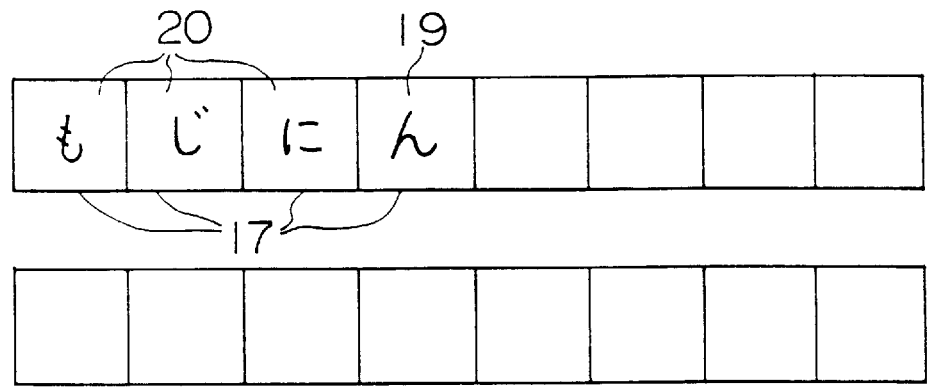
FIG. 4 is illustrations of operation of the first embodiment.
Figure 4B:
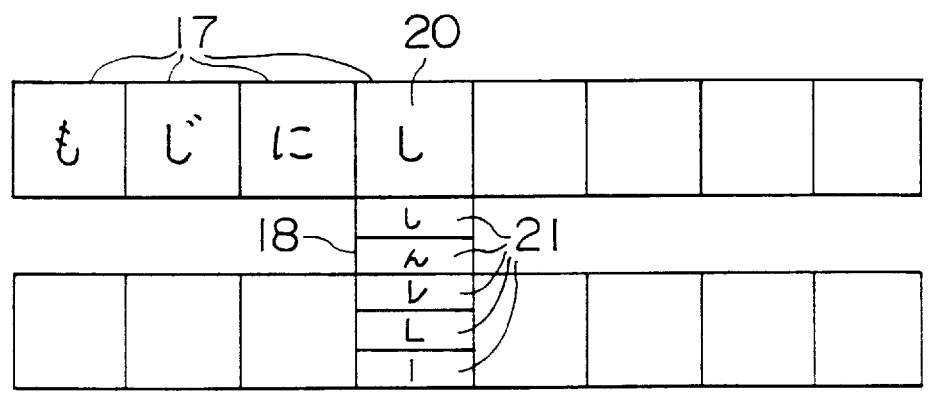
Figure 4C:
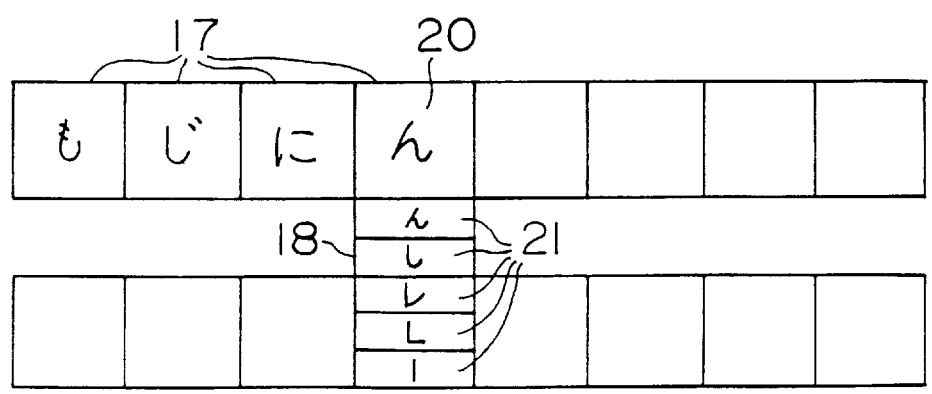
Figure 4D:
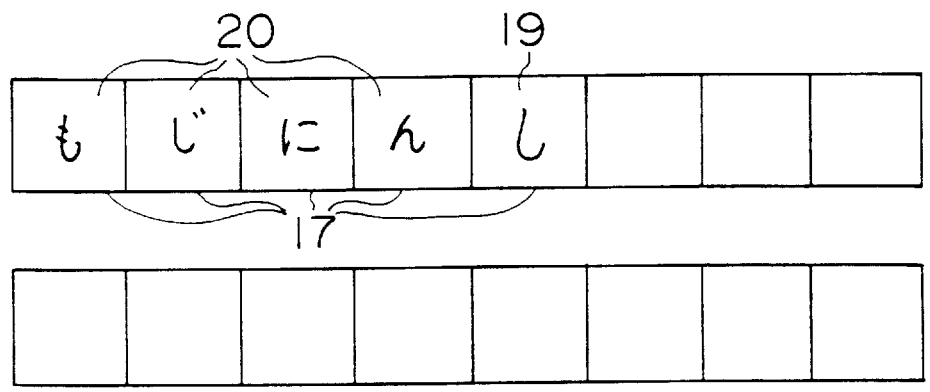

The hand-written hiragana character " ん " has thus been correctly entered. Then, the operator brings the stylus pen 15 into contact with the fifth character box 17 of the upper row on the display device 2 so as to enter a next character, e.g., hiragana character "し". This operation is detected by the input start detecting portion 12 which then operates to erase the content in the window memory 9 and to write the data of the hand-written character in the frame memory. Then, the display control circuit 13 operates to cause the display device 12 to display a hand-written character pattern 19 in the fourth character box 17, as shown in FIG. 4(d). Then, cut-out of the character, recognition of character, display of selected candidate and, if necessary, correction are performed in the same procedure as that described before.

Figure 4E:
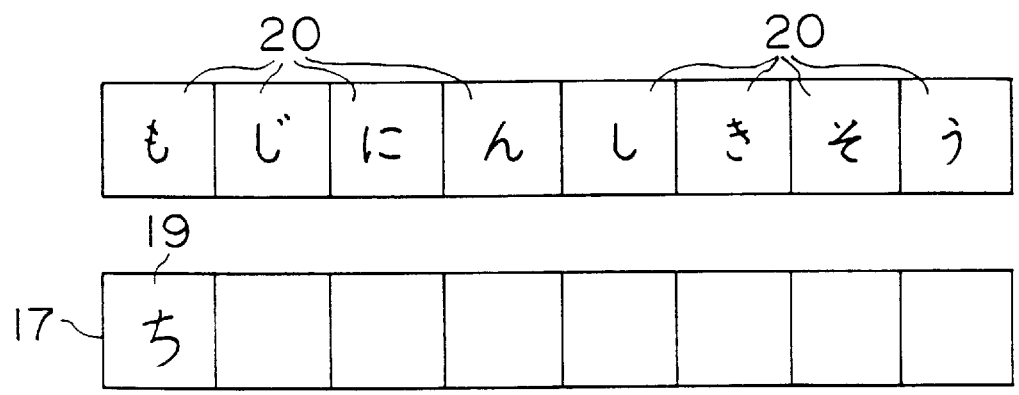
Figure 4F:
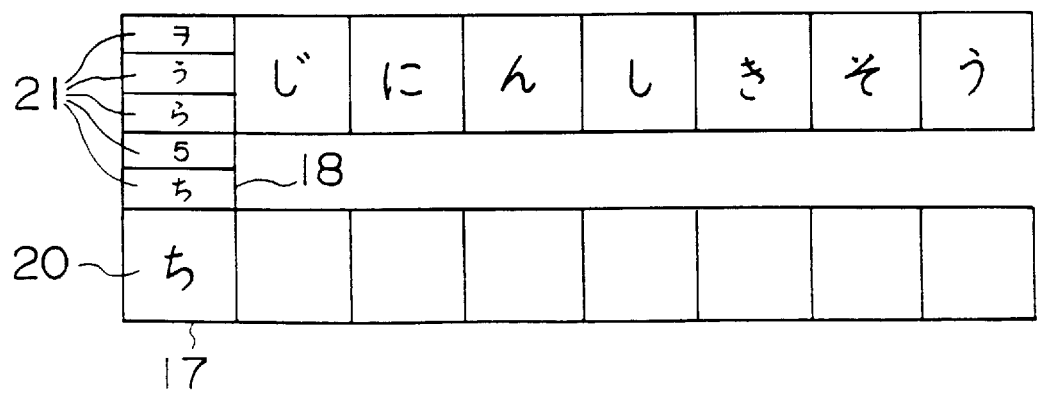

After the character boxes 17 of the upper row on the display device 12 have been filled, the operator enters the next hand-written character into the first character box 17 of the lower row as counted from the left, by putting the stylus pen 17 into contact with this character box 17 and writing, for example, hiragana character "ち". This entered hand-written character is written in the frame memory 8 as stated before, and the hand-written character pattern 19 is displayed in the first character box of the lower row on the display device 2 as a result of operation of the display control circuit 13, as shown in FIG. 4(e). Subsequently, cut-out of the character is performed by the character cut-out portion 4, followed by character recognition performed by the character recognition portion 5, whereby the character codes of five candidate characters exhibiting similarity are stored in the recognition result memory 6. Then, standard character patterns 20 and 21 corresponding to the character codes are written in the portions of the memories 8 and 9 corresponding to the character box 17 and the associated candidate character box 18. Then, the standard character patterns 20 and 21 are displayed in the above-mentioned character box 17 and the associated candidate character box 18 by the operation of the display control circuit 13, as shown in FIG. 4(f). In this case, however, the candidate character box 18 displays the candidate characters in such a manner that the character exhibiting highest degree of similarity appears in the lowermost sub-box, as will be seen from FIG. 4(f). Thus, in the illustrated case, hiragana character "ち" appears in the lowermost sub-box, and numeral 5, hiragana character "ら", hiragana character "う" and katakana character "ヲ" are displayed in the second to fifth sub-boxes as counted from the bottom of the candidate character box 18. It will be understood that this manner of display minimizes the distance of movement of the stylus pen 15 when a correction is conducted.

As will be understood from the foregoing description, in the first embodiment of the present invention, there are provided a plurality of character boxes 17 which function both as hand-write areas and character recognition result display areas, and a candidate character box 18 is provided adjacent to each character box 17. The candidate character box can display a plurality of candidate characters for the character in the associated character box 17. When the correction of the recognition result is necessary, the operator simply touches the correct character from the group of candidate characters with the stylus pen. It is therefore possible to accurately enter hand-written characters without requiring the operator to largely and frequently turn eyes, with minimal movement of the stylus pen.

In the first embodiment described hereinbefore, the character boxes 17 are arrayed in two horizontal rows. The candidate character box 18 corresponding to each of the character box 17 of the upper row is shown by a window which overlies the character box 17 of the lower row, whereas, the candidate character box 18 associated with each character box 17 of the lower row is displayed in a window which overlies the character box 17 of the upper row. This arrangement makes it possible to reduce the areas of the display device and the tablet.

The described positional relationship between the character box 17 and the associated candidate character box 18, however, is not exclusive. Namely, the described arrangement may be modified such that the candidate character box 18 for a character box 17 of the upper row is formed on the upper side of this character box, while the candidate character box 18 associated with a character box 17 of the lower low is displayed beneath this character box 17.

Figure 5A:
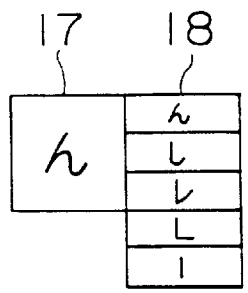
FIG. 5 is illustrations of another example of the candidate character display boxes.
Figure 5B:
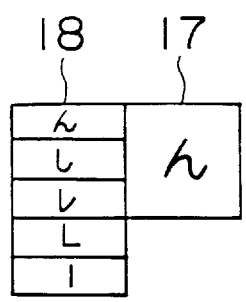
Figure 5C:
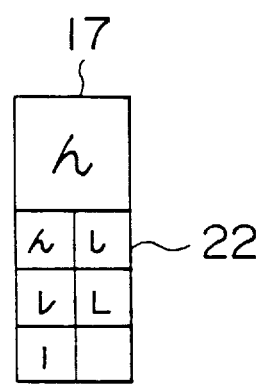

It is also possible to arrange such that the candidate character box is displayed on the right or left side of the associated character box 17 as shown in FIGS. 5(a) and 5(b). It is even possible to display a candidate character frame in the form of a matrix of sub-boxes as shown n FIG. 5(c).

Figure 6:
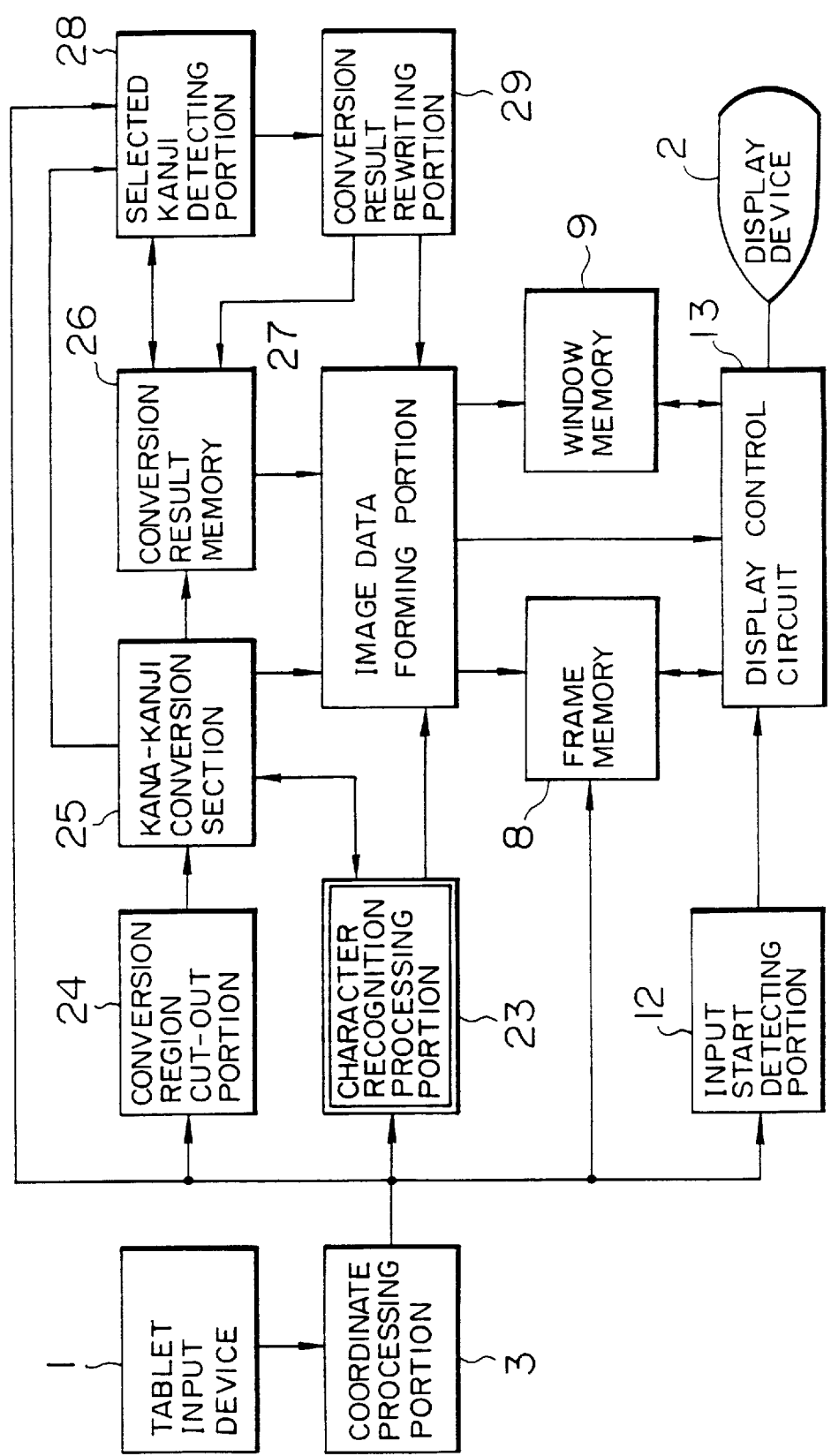
FIG. 6 is a block diagram showing the construction of a second embodiment of the hand-written character entry apparatus of the present invention.

A second embodiment of the present invention will be described with reference to FIG. 6. This second embodiment has a kanji conversion function in addition to the functions performed by the first embodiment. In FIG. 6, parts or components which are the same as those in the first embodiment are denoted by the same reference numerals as those appearing in FIG. 1.

More specifically, the hand-written character entry apparatus of the second embodiment has a tablet input device 1, a display device 2, a coordinate processing portion 3, a frame memory 8, a window memory 9, an input start detecting portion 12, a display control circuit 13, a character recognition processing portion 23, a conversion region cut-out portion 24, a kana-kanji converting portion 15, a conversion result memory 26, an image data forming portion 27, a selected kanji detecting portion 28, and a conversion result rewriting portion 29.

The character recognition processing portion has all the functions of the character cut-out portion 4, character recognition portion 5, recognition result memory 6, selected character detecting portion 10 and the recognition result rewiring portion 11 which are employed in the first embodiment.

The conversion region cut-out portion 24 defines and cut outs, from the train of entered characters, a batch of series of characters which are to be converted into kanji character or characters. This operation is typically conducted by sliding the stylus pen 15 in contact with the display screen over two or more successive character boxes 17 displaying characters which have been correctly entered and recognized in a manner to draw a continuous line over these character boxes 17. The series of characters shown in the character boxes on the this drawn line are regarded as being the region to be converted. Obviously, however, any suitable other method can be used for the purpose of designating the region of the characters to be converted into kanji character or characters.

The kana-kanji converting portion 25 reads the series of characters from the successive character boxes 17 cut out form the character recognition processing portion 23 and converts this batch of characters into a kanji character or characters so as to provide a plurality of candidate kanji characters. The candidate kanji characters are then stored in the conversion result memory 26 in a predetermined order, e.g., in the order of frequency of appearance or use, and informs both the image data forming portion 27 and the selected kanji detecting portion 28 of the completion of the kana-kanji converting operation.

The conversion result memory 26 stores the codes corresponding to the plurality of candidate kanji characters for the batch of the character boxes 17 which has been subjected to the kana-kanji conversion.

The image data forming portion 27 writes image data in the frame memory 8 and the window memory 9 on the basis of the content of the conversion result memory 26, and informs the display control circuit 13 that the writing in these memories has been finished. The writing is conducted preferably but not exclusively in such a manner that the first candidate kanji character or characters having the highest frequency of appearance or use are written in the portion of the frame memory 8 corresponding to the character boxes 17,and standard kanji patterns corresponding to the plurality of candidate kanji characters are written in the portion of the window memory 9 corresponding to the candidate character frame 18. Obviously, the entry, recognition and display of the characters which do not need conversion into kanji characters are executed in the same manners as those described in connection with the first embodiment.

When a sub-box of the candidate character box 18 is appointed by the tablet input device 1 after the completion of the kana-kanji conversion, the selected kanji detecting portion 28 operates to detect the coordinate values of the appointed sub-box, so as to detect which one of the plurality of candidate kanji characters has been selected on the basis of the content of the conversion result memory 26, and delivers the result of the detection to the conversion result rewiring portion 29. The conversion result requiring portion 29 then operates to rewrite the content of the conversion result memory 26 such that the selected candidate kanji character is shown as the first candidate, and delivers the result of the rewiring to the image data forming portion 27.

A description will now be given of the operation of the second embodiment. The process for the entry of hand-written character and recognition of the entered character is not described because this process is executed in the same manner as that in the first embodiment.

Figure 7A:
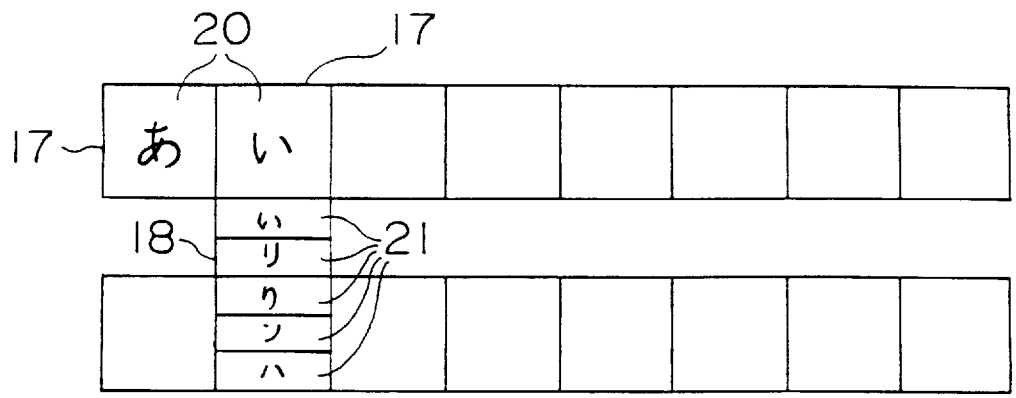
FIG. 7 is illustrations of the embodiment shown in FIG. 6.

Referring to FIG. 7(a), it is assumed that standard character patterns 20 corresponding to hiragana characters "あ" and "い", which have been entered by hand-writing and correctly recognized, are displayed in the first and second character boxes 17 of the upper row on the display device 2.

Figure 7B:
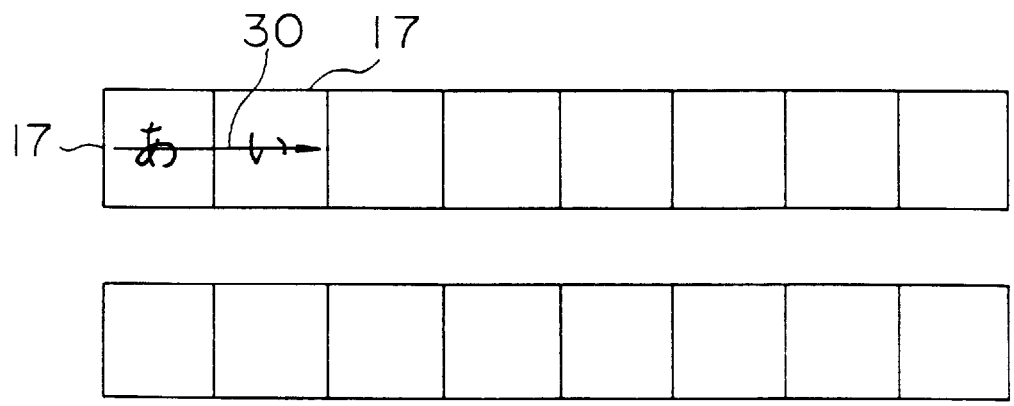

For the purpose of converting the batch of successive hiragana characters "あい", the operator puts the stylus pen 15 into contact with the first character box 17 of the upper row on the display device 2 and slides it in contact with the display surface to the position of the second character box 17 of the upper row in a manner to draw a line which extends between the first and the second character boxes 17 as shown in FIG. 7(b). The line is designated at numeral 30,but this line actually is not displayed.

Consequently, the region cut-out portion 24 detects that the first and second character boxes 17 of the upper row as counted from the left end are the region over which the conversion is to be performed, and delivers the result of the detection to the kana-kanji converting portion 25. Upon receipt of this detection result, the kana-kanji converting portion 25 performs conversion of characters "あい" in the character boxes 17 included in the conversion region into kanji, and presents a plurality of candidate kanji characters. In this embodiment, five candidate kanji characters "愛", "逢", "哀", "相" and "藍" are presented, and these candidate kanji characters are stored in the conversion result memory 6 in, for example, the mentioned order which coincides with the order of frequency of use.

After completion of the kana-kanji conversion, the image data forming portion 27 operates to write a standard kanji character pattern corresponding to "愛" in the portion of the frame memory corresponding to the character first character box 17 of the upper row. At the same time, as a result of operation of the image data forming portion 27, standard kanji character patterns 32 corresponding to the kanji characters "愛", "逢", "哀", "相" and "藍" are written in the portion of the window memory 9 corresponding to the candidate character box 18 associated with the above-mentioned character box 17.

Figure 7C:
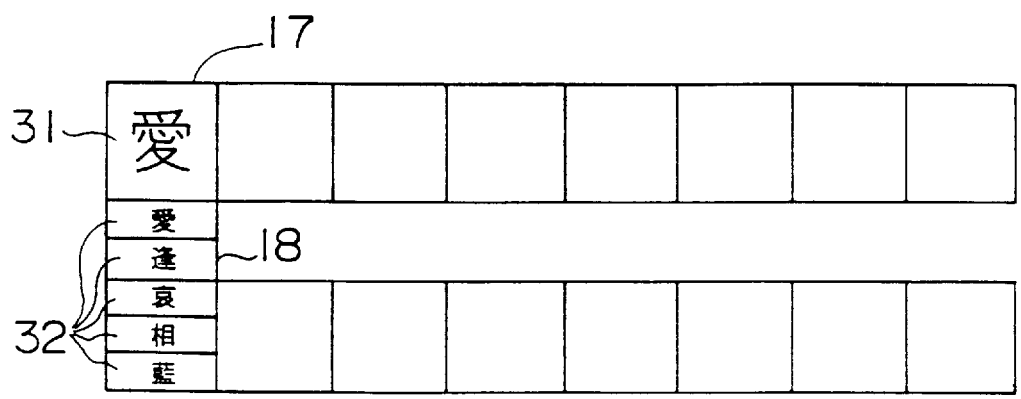

The display control circuit 13, when informed of the completion of writing of the image data, operates such that the standard kanji character pattern 31 corresponding to the kanji character "愛" is displayed in the first character box 17 of the upper row on the display device 2, as shown in FIG. 7(c), while displaying, beneath the above-mentioned character box 17, a candidate character box 18 which contains standard kanji character patterns 21 corresponding to the kanji characters "愛", "逢", "哀", "相" and "藍".

It is possible to replace the kanji character "愛" displayed in the above-mentioned character box 17 with another kanji character selected from the group of kanji characters contained in the candidate character box 18. The manipulation of the device by the operator and the operation of the device are materially the same as those for alteration of the character recognition result and, hence, are not described in detail.

According to the second embodiment of the present invention, it is thus possible to display a plurality of candidate kanji characters in the candidate character box 18, so that the result of the kana-kanji conversion can be corrected as desired by the same procedure as that employed in the correction of the result of recognition of hand-written character. Consequently, the user can enter kanji characters with high degree of accuracy with reduced amounts of turning of eyes and stylus pen movement.

In the first and second embodiments described, the kana or kanji character which is the same as that displayed in the character box 17 is displayed in the initial or first sub-box of the candidate character box 18. Such duplication of display, however, is not essential and the display of the same character in the first sub-box of the candidate character box may be omitted. It is also to be pointed out that lines defining the character boxes and candidate character boxes may not be displayed. In the described first and second embodiments, the frame memory and the window memory are formed as separate memories. This, however, is not exclusive and it is possible to arrange such that part of the frame memory is used as the window memory. In such a case, it is not necessary to provide a separate window memory.

Although the invention has been described through its specific forms, it is to be understood that the described embodiments are only illustrative and various changes and modifications may be imparted thereto without departing from the scope of the invention which is limited solely by the appended claims.

What is claimed is:

1. A hand-written character entry apparatus of a type having an input device for inputting hand-written characters and a display device, wherein a hand-written character pattern inputted by the input device is recognized and a Plurality of candidate characters having configurations similar to that of the recognized character pattern are extracted and standard character patterns corresponding to the candidate characters are displayed for selection on said display device, said hand-written character entry apparatus comprising:

first means for providing, at a position in said display device corresponding to the position where the handwritten character is inputted by said input device, an input character display areas for displaying a first candidate character exhibiting the highest degree of similarity among said candidate characters;

second means for providing, at a position in said display device abutting said input character display area, a candidate character display areas for displaying the plurality of candidate characters;

means for detecting derivation of a signal indicating any portion of said candidate character display area has been inputted through said input device; and means for replacing said first candidate character with a selected one of the candidate characters displayed at a portion of said candidate character display area appointed by said input device;

a plurality of said input character display areas being provided, and said candidate character display area being provided for each of said input character display area.

2. A hand-written character entry apparatus according to claim 1, wherein a candidate character display area associated with one of said input character display areas is displayed in a window which overlies another input character display area or areas.

3. A hand-written character entry apparatus according to claim 1, wherein said input device and said display device are integrated with each other.

4. A hand-written character entry apparatus according to claim 1, further comprising:

means for appointing, by operation of said input device, at least two successive input character display areas from among a series of input character display areas displaying first candidate characters;

means for conducting kana-kanji conversion of a batch of first candidate characters displayed in said at least two successive input character display areas appointed by the operation of said input device, so as to extract a plurality of candidate kanji characters;

means for enabling a first candidate kanji character in one of said at least two successive input character display areas while enabling said plurality of candidate kanji characters in said candidate character display area including or excluding said first candidate kanji character; and means for replacing said first candidate kanji character with another candidate kanji character selected through said input device out of said candidate kanji characters displayed in said candidate character display area.

5. The method of claim 4 further comprising responding to the inscribed character to activate the display so a reproduction of the inscribed character and the candidate characters are displayed on the display in the abutting regions.

6. The method of claim 4 wherein the selected one of the displayed plural candidate characters is selected by pressing on a portion of a display where the selected candidate character is displayed.

7. A method of recognizing an inscribed character comprising responding to the inscribed character to select plural candidate characters similar in shape to the inscribed character, displaying the plural candidate characters in a region abutting a region where there is a representation of the inscribed character, selecting one of the displayed plural candidate characters, the selected one of the displayed plural candidate characters being the intended character for the inscribed character, and replacing the inscribed character with the selected one of the displayed plural candidate characters; further comprising responding to the inscribed character to activate the display so a reproduction of the inscribed character and all of the candidate characters are simultaneously displayed on the display in the abutting regions, the candidate character most similar to the inscribed character being closer to the inscribed character than any of the other candidate characters.

8. The method of claim 7 wherein the device responds to the sensor to display the inscribed character on the second region of the display and replace the inscribed character on the second region of the display with the selected character.

9. The method of claim 8 wherein the selected one of the displayed plural candidate characters is selected by pressing on the display for the candidate characters.

10. The method of claim 9 wherein the signal is derived by pressing on the region of the display where the selected character is displayed.

11. A method of recognizing an inscribed character with a device including a memory for storing signals representing the shapes of plural inscribed characters, a sensor for the shapes of inscribed characters, a comparator for the stored signals and signals from the sensor, and a display, the method comprising:

sensing the shape of the inscribed character with the sensor, comparing in the comparator a signal representing the shape of the inscribed character as sensed by the sensor and the stored signals representing the shapes of plural characters likely to be inscribed to derive signals representing plural selected candidate characters similar in shape to the inscribed character, responding to the signals representing plural selected candidate characters similar in shape to the inscribed character to display the plural candidate characters on a first region of the display abutting a second region where there is a representation of the inscribed character, selecting one of the displayed plural candidate characters, the selected one of the displayed plural candidate characters being the intended character for the inscribed character, deriving a signal indicative of which of the displayed candidate characters is the selected character, supplying the signal indicative of which of the displayed candidate characters is the selected character to the device to replace the inscribed character with the selected character; and responding to the inscribed character to activate the display so a reproduction of the inscribed character and all of the candidate characters are simultaneously displayed on the display in the abutting regions, the candidate character most similar to the inscribed character being closer to the inscribed character than any of the other candidate characters.

12. The apparatus of claim 11 wherein the second display region simultaneously displays the candidate characters most similar in shape to the inscribed character.

13. Apparatus for recognizing an inscribed character comprising a memory storing signals representing the shapes of plural inscribed characters, a sensor for the shapes of inscribed characters, a comparator for the stored signals and signals from the sensor, a display responsive to the sensor for displaying the inscribed character in a first region of the display, the comparator being responsive to the sensor and the memory for (a) selecting plural candidate characters from the memory most similar in shape to the inscribed character, and (b) activating the display to display the plural candidate characters most similar in shape to the inscribed character in a second region of the display abutting the first region, means for deriving a signal indicating which displayed character is most similar in shape to the inscribed character, the means responsive to the signal indicating which displayed character is most similar in shape to the inscribed character for replacing the displayed inscribed character with the selected character; the second display region simultaneously displays the candidate characters most similar in shape to the inscribed character, the candidate character most similar to the inscribed character being closer to the inscribed character than any of the other candidate characters.

14. The apparatus of claim 1 wherein the first candidate character is one of the characters displayed in the candidate character display area.

15. The apparatus of claim 1 wherein the first candidate character is not displayed in the candidate character display area.

* * * * *